United States Patent
Faffelberger et al.

(10) Patent No.: US 10,047,924 B2
(45) Date of Patent: Aug. 14, 2018

(54) LIGHT SYSTEM FOR A MOTOR VEHICLE

(71) Applicant: ZKW Group GmbH, Wieselburg (AT)

(72) Inventors: Anton Faffelberger, Krummnussbaum (AT); Laura Danner, Mauer b. Amstetten (AT)

(73) Assignee: ZKW GROUP GMBH, Wieselburg (AT)

( * ) Notice: Subject to any disclaimer, the term of this patent is extended or adjusted under 35 U.S.C. 154(b) by 0 days.

(21) Appl. No.: 15/523,493

(22) PCT Filed: Oct. 29, 2015

(86) PCT No.: PCT/AT2015/050271
§ 371 (c)(1),
(2) Date: Aug. 17, 2017

(87) PCT Pub. No.: WO2016/070210
PCT Pub. Date: May 12, 2016

(65) Prior Publication Data
US 2017/0363265 A1     Dec. 21, 2017

(30) Foreign Application Priority Data
Nov. 3, 2014   (AT) .............................. A 50793/2014

(51) Int. Cl.
*F21V 9/00*     (2018.01)
*F21S 41/24*    (2018.01)
(Continued)

(52) U.S. Cl.
CPC ............ *F21S 41/24* (2018.01); *B60Q 1/0011* (2013.01); *B60Q 1/0076* (2013.01); *F21S 41/14* (2018.01);
(Continued)

(58) Field of Classification Search
CPC .. F21S 48/1241; F21S 48/1145; F21S 48/145; F21S 41/20; F21S 41/24;
(Continued)

(56) References Cited

U.S. PATENT DOCUMENTS 4,208,363 A    6/1980   Yevick
5,001,306 A    3/1991   Purcell
(Continued)

FOREIGN PATENT DOCUMENTS

DE          20318691 U1     2/2004
DE       102007005779 A1    8/2008
(Continued)

OTHER PUBLICATIONS

Machine English Translation of JP2016126948A Jul. 11, 2016.*
(Continued)

*Primary Examiner* — Anh Mai
*Assistant Examiner* — Glenn Zimmerman
(74) *Attorney, Agent, or Firm* — Eversheds Sutherland (US) LLP

(57) ABSTRACT

A motor vehicle light system (2) comprising at least two light sources (12a through 12d), at least two optical waveguides (11a through 11d), at least one downstream transparent emission element (10), and at least one controller (5) for time-offset actuation of the at least two light sources (12a through 12d), the at least two light sources (12a through 12d) being set up to couple light into one optical waveguide each (11a through 11d), the optical waveguides (11a through 11d) each having at least one light out-coupling section (14a through 14c) that is set up to couple light into a light coupling section (19) of the emission element (10), wherein the light coupling section (19) of the emission element (10) is step-shaped.

12 Claims, 5 Drawing Sheets

Figure 1:
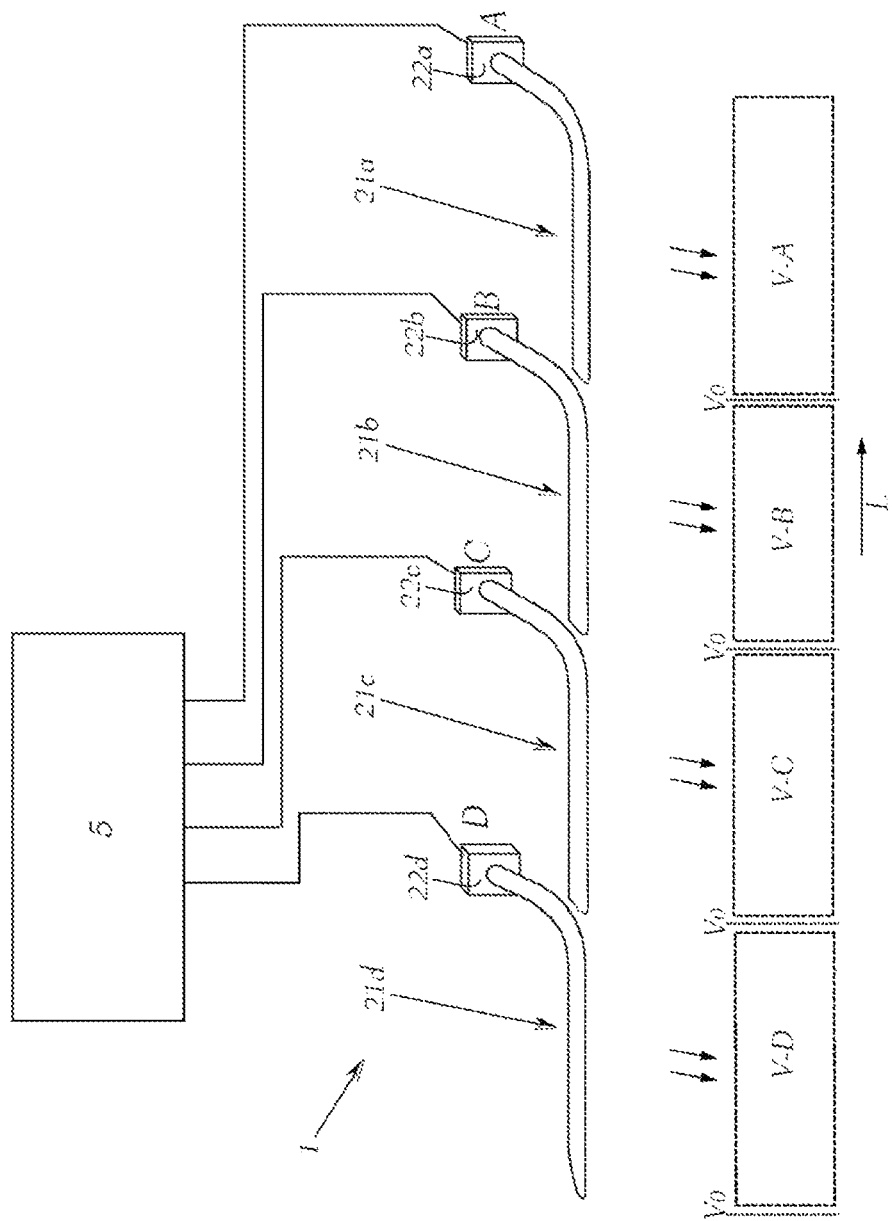

(51) Int. Cl.
  *F21S 8/10* (2006.01)
  *F21V 8/00* (2006.01)
  *B60Q 1/00* (2006.01)
  *F21S 41/14* (2018.01)
  *F21S 41/43* (2018.01)

(52) U.S. Cl.
  CPC ........... *F21S 41/43* (2018.01); *F21S 48/1145* (2013.01); *F21S 48/1241* (2013.01); *F21S 48/145* (2013.01); *G02B 6/002* (2013.01); *G02B 6/0028* (2013.01)

(58) Field of Classification Search
  CPC ......... F21S 41/43; F21S 41/14; B60Q 1/0011; B60Q 1/0076; G02B 6/002; G02B 6/0028; F21V 2200/00; F21V 2200/10; F21V 2200/15; F21W 2102/00
  USPC ....................................................... 362/511
  See application file for complete search history.

(56) References Cited

U.S. PATENT DOCUMENTS

| | | | |
|---|---|---|---|
| 5,184,883 | A | 2/1993 | Finch et al. |
| 9,463,547 | B2 | 10/2016 | Fankhauser et al. |
| 9,563,010 | B2 | 2/2017 | Reinprecht et al. |
| 2014/0218951 | A1 | 8/2014 | Takada |
| 2014/0030109 | A1 | 10/2014 | Watanabe et al. |
| 2014/0321136 | A1* | 10/2014 | Reuschel ................. B60Q 9/00 362/511 |
| 2015/0008840 | A1* | 1/2015 | Reinprecht ............ G02B 6/001 315/210 |
| 2015/0277027 | A1* | 10/2015 | Koizumi ................ F21S 48/215 362/511 |
| 2016/0193954 | A1* | 7/2016 | Nakada ................ G02B 6/0078 362/511 |
| 2017/0219178 | A1* | 8/2017 | Faffelberger ............ F21S 41/24 |

FOREIGN PATENT DOCUMENTS

| | | | | |
|---|---|---|---|---|
| JP | 2016126948 A | * | 7/2016 | ............ G02B 6/0078 |
| WO | WO 2013120124 A2 | * | 8/2013 | ............. G02B 6/001 |

OTHER PUBLICATIONS

Office Action issued in Austrian application No. A 50793/2014, dated Oct. 22, 2015.

International Preliminary Report on Patentability for PCT/AT2015/050271, dated Feb. 7, 2017.

* cited by examiner

LIGHT SYSTEM FOR A MOTOR VEHICLE

The invention relates to a motor vehicle light system comprising at least two light sources, at least two optical waveguides, at least one downstream transparent emission element, and at least one controller for time-offset actuation of the at least two light sources, the at least two light sources being set up to couple light into one optical waveguide each, the optical waveguides each having at least one light out-coupling section that is set up to couple light into a light coupling section of the emission element. Preferably, each light source is associated with one optical waveguide each.

The invention also relates to a motor vehicle with an inventive light system and a motor vehicle headlight with an inventive light system.

Light systems are known from the prior art in which individual light sources can be controlled independently of one another, the light emitted from the individual light sources being emitted or directed in a desired direction by optical waveguides that are arranged next to one another. The light sources are actuated to select the amount of light that they emit over time so as to produce the impression of a moving light pattern or light distribution (or an appearance) of a so-called scanner, making it possible to achieve a scanner effect. Such a light system or a process suitable for this was disclosed, for example, in WO 2013/120124 A2. In this system, optical waveguides emit light in a common emission direction or out-couple light in this direction, individual optical waveguides being offset to one another in the direction normal to the emission direction. The offset between the optical waveguides produces dark, less intensely illuminated areas in the light pattern of such a light system, which impairs the impression of a flowing transition between the light beams emitted by the optical waveguides, since the individual optical waveguides are recognizable as such.

Therefore, it is a goal of the invention to create a light system that is economical and simple to produce, that has high mechanical load-bearing capacity, and that produces a continuous, homogeneous light pattern that is better than that of the prior art.

This is accomplished, in a first aspect of the invention, with a light system of the type mentioned at the beginning in which the light coupling section of the emission element is step-shaped.

This makes it possible to run the optical waveguides close to one another and for the light emitted by the individual optical waveguides to be emitted through the emission element. Preferably the optical waveguides can be placed at a constant distance behind the emission element, without this requiring that the optical waveguides be strongly curved along their longitudinal extension. Every optical waveguide has a light out-coupling section that is associated with an area of the light coupling section of the emission element. This can achieve an extremely robust and compact structure of a light system that is especially well suited for producing a scanner by allowing a uniform transition between the light patterns produced by means of the optical waveguides, so that it is possible to achieve designs that cannot be implemented with a single optical waveguide. Thus, it is possible, e.g., to arrange the optical waveguides in a plane that is oriented parallel to the emission direction of the optical waveguides, so that individual optical waveguides can be arranged one behind the other in the direction opposite the emission direction. The light coupling section and a light exit surface of the emission element can each have a stepped course, preventing a lateral offset of individual light beams.

The expression "time-offset actuation" is understood to mean an open-loop or closed-loop control that is able to apply signals that are different from one another to the individual light sources. Apart from being offset in time, the signals can have the same course, or also be completely different. Examples of possible actuation signals and light patterns or luminous intensities of individual light sources resulting from them can be found in WO 2013/120124 A2. As defined by this invention, an "optical waveguide" should be understood to be a structure in which incident light can be totally reflected off the walls along the length of the optical waveguide. Such an optical waveguide can be in the form of a solid body. In this connection, it is preferable for the optical waveguide to be made of a transparent, colorless plastic. Alternatively, it can be made of glass or also of any other material, for example silicone, that is suitable for conducting light. The emission element can also be in the form of a solid body and be made, e.g., of plastic, glass, silicone, or any other material that is suitable for conducting light. LEDs are preferred suitable light sources. Alternatively, it is also possible to use any other light sources known to the person skilled in the art, such as incandescent bulbs, xenon lamps, etc.

It can be favorable if the optical waveguides have two straight sides that are connected together by means of a curved section, the straight sides including an angle of at least 60°. This allows the structure of the inventive light system to be especially compact.

It can be especially expedient if the optical waveguides are in the form of illumination rods. Illumination rods have good light conducting properties while requiring little space, and have good mechanical load-bearing capacity, and therefore are especially well suited to be optical waveguides. The diameter of the illumination rods can preferably be between 6 mm and 10 mm. The illumination rods have, in their light out-coupling sections, optically active irregularities that are set up to deflect light that propagates along the illumination rod in such a way that it exits from the illumination rod through the light out-coupling section and enters the light coupling section of the emission element. The irregularities can preferably be in the form of prisms or prism-like projections/depressions within the illumination rod.

In order to make the structure of the invention especially simple and robust, it can be provided that the emission element is made in a single piece.

In addition, it can be provided that the emission element has a continuous light exit surface. A continuous light exit surface is understood to be a light exit surface that is bounded by edges that have a continuous course, apart from the vertices.

An especially compact structure of the invention can be achieved if the number of optical waveguides exceeds the number of steps by one. Therefore, a number of n steps is associated with n+1 optical waveguides.

It is favorable if at least three optical waveguides are provided, which can achieve a light pattern with especially good resolution. The number of optical waveguides or steps can be exactly or at least three, four, five, six, or more.

To have sufficient separation between the optical waveguides and simultaneously bring the light out-coupling surfaces of the optical waveguides as close to as possible to the light coupling surfaces of the emission element, it can be provided that the height h of every step is greater than the diameter of a corresponding optical waveguide.

Preferably, the individual optical waveguides can be essentially parallel to one another, at least in sections. This allows the light system to have an especially compact structure. The expression "essentially parallel" is understood to mean alignment of the optical waveguides in which they deviate from one another by a maximum angle of 5°. Preferably, the maximum deviation of the alignment of individual optical waveguides from one another is an angle of 1°.

In order to prevent unwanted light coupling between the individual optical waveguides, it can be provided that the optical waveguides have shield elements arranged between them.

In addition, individual optical waveguides can be separated from one another by at least 1 mm, to allow a certain freedom of movement [relative] to one another. This can cushion movements caused by vibrations without the optical waveguides abrading one another and damaging their surfaces. This also makes it possible to compensate for inaccuracies that should be attributed to manufacturing tolerances.

In an analogous manner, it can be provided that the light out-coupling section of the optical waveguide is separated from the light coupling section of the emission element by at least 1 mm.

Another aspect of the invention relates to a motor vehicle and a motor vehicle headlight with an inventive light system.

Figure 2:
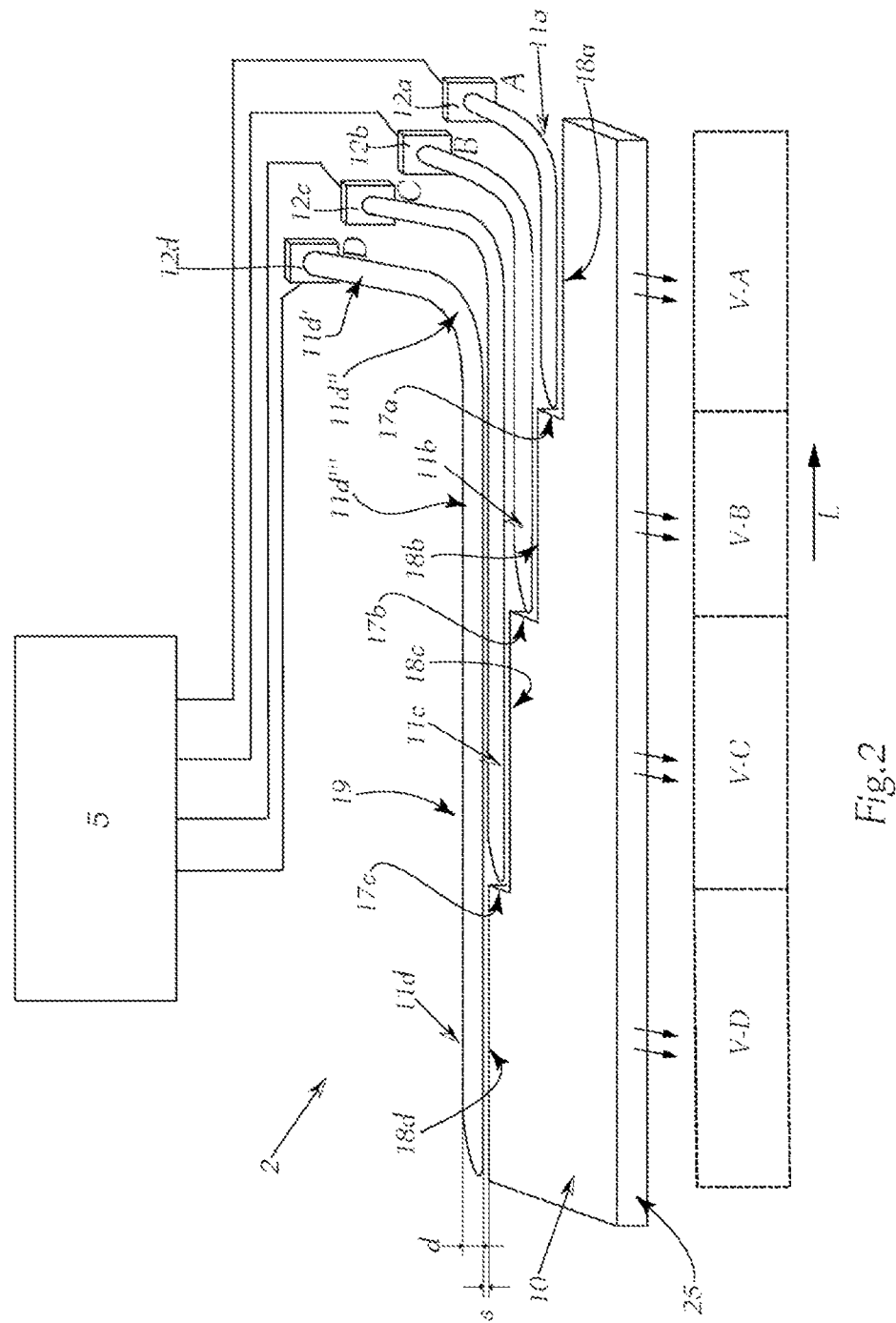
Figures 3, 4:
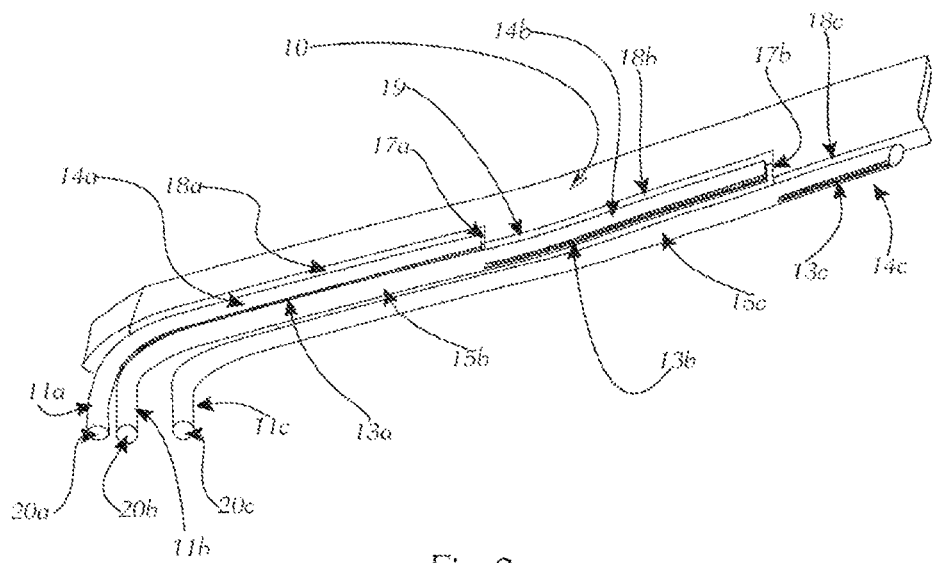
Figure 5:
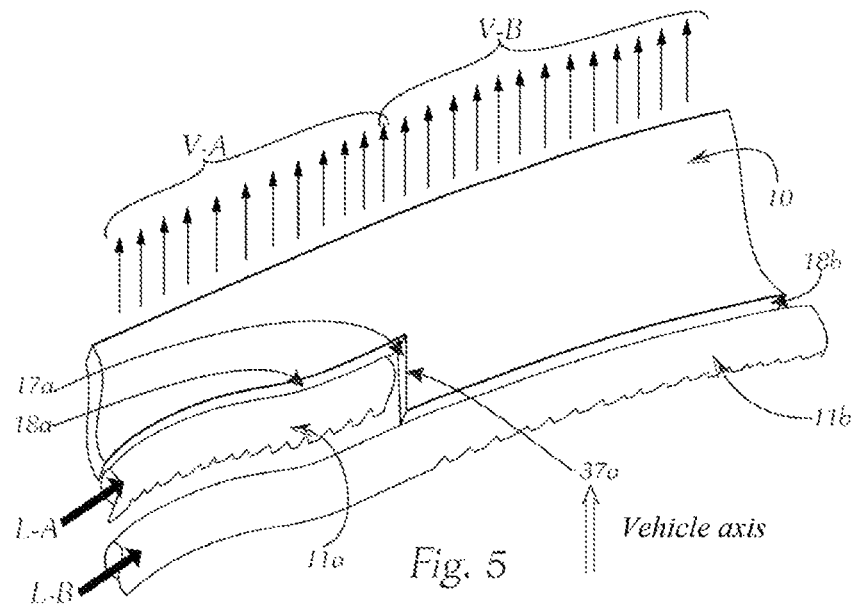
Figure 6:
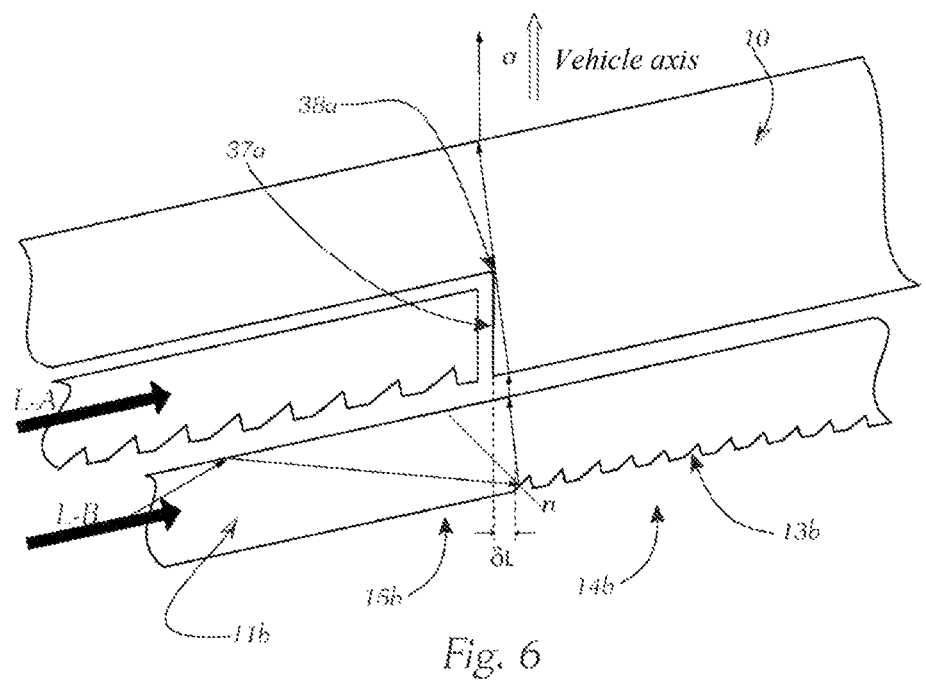
Figure 6A:
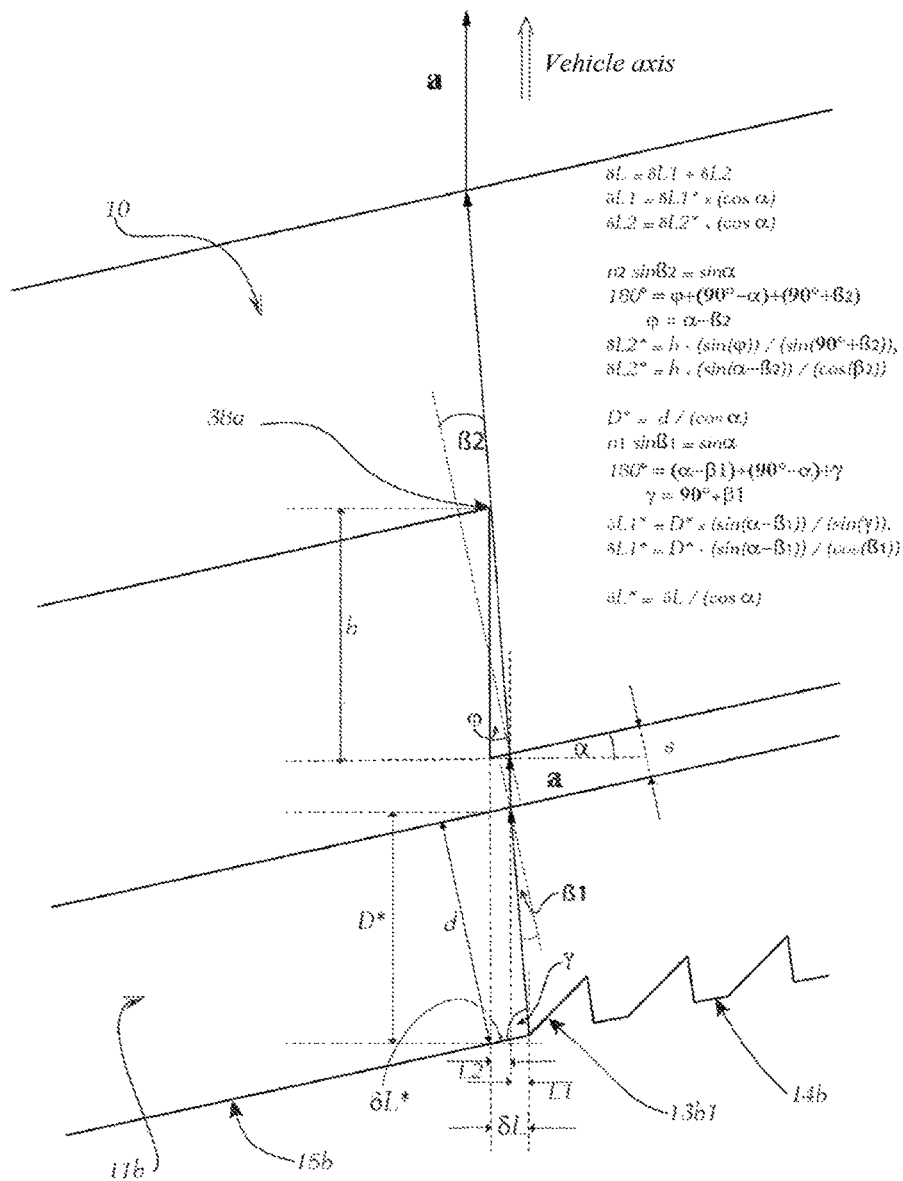

The invention is explained in detail below using multiple non-restrictive sample embodiments, which are illustrated in the figures. The figures are as follows FIG. 1 is a schematic representation of a light system according to the prior art;

FIG. 2 is a schematic representation of one embodiment of an inventive light system;

FIG. 3 is a perspective representation of the optical waveguide and the emission element according to FIG. 2, FIG. 4 is a detailed representation of individual components of the light system according to FIG. 3, FIG. 5 is another perspective representation of a detail of individual components of the light system according to FIG. 4, FIG. 6 [shows], in a detailed representation of FIG. 5, a sample course of a light beam a coupled in through the optical waveguide 11b into the emission element 10 and emitted from it; and FIG. 6a is a simplified representation of the transition of the light beam a from the optical waveguide 11b into the emission element 10.

Unless otherwise indicated, in the following discussion the same reference numbers designate the same features.

FIG. 1 shows a schematic representation of a light system 1 according to the prior art. In it, a controller 5 can be seen that is connected with the light sources 22a through 22d. The light sources 22a through 22d couple light into downstream optical waveguides 21a through 21d, which in turn emit/out-couple light forward in the direction V shown by the arrows. The design of the light system according to the prior art, especially separating the optical waveguides 21a through 21d from one another, produces, between light patterns V-A through V-D, which are associated with the respective optical waveguides 21a through 21d, dark areas V0 which come to lie between the brightly illuminated areas V-A through V-D, and impair the quality of a scanner effect actuated by the controller 5, that is, there is not a continuous, homogeneous light pattern.

FIG. 2 shows a schematic representation of one sample embodiment of an inventive light system 2; It once again contains a controller 5 that is connected with light sources 12a through 12d, downstream of which are optical waveguides 11a through 11d, so that the light sources 12a through 12d couple light into the optical waveguides 11a through 11d. The optical waveguides 11a through 11d are in the form of illumination rods, which in the sample embodiment shown have two straight sides $11d'$ and $11d'''$ and a curved section $11d''$ connecting the straight sides (for simplicity, in FIG. 2 only the optical waveguide 11d has been labeled with the corresponding reference numbers; the remaining optical waveguides 11a through 11c have an analogous form). Alternatively, the optical waveguides 11a through 11d or the illumination rods could also any other form. The optical waveguides 11a through 11d are preferably in the form of solid bodies, which can consist of transparent polycarbonate, for example. The sides $11d'$ and $11d'$ are at an angle of at least 60° to one another. The light source 12d feeds light into the straight side $11d'$, and this light is conducted through the curved section $11d''$ into the following straight side $11d'''$, where it comes to a light out-coupling section 14d (14a through 14c are analogous), which is shown in FIG. 3, and introduced into a downstream transparent emission element 10. To accomplish this, the emission element 10 has light coupling surfaces 18a through 18d, which form, together with sloping step surfaces 17a through 17c, a step-shaped light coupling section 19 of the emission element 10. The side $11d'''$ (and analogously corresponding sides of the optical waveguides 11a through 11c) are included in the steps or lie against corresponding surfaces of the steps. The emission element 10 is set up to emit light in the emission direction V, the light exiting through the light exit surface 25 of the emission element 10, so that no dark area comes to lie between the light patterns produced by the individual light sources 12a through 12d. A scanner effect can be achieved, for example, by turning on light sources 12d through 12a in succession. It is also possible to specify any transitions in the luminous intensity of the light emitted by the light sources 12a through 12d. Naturally it is possible to change the number of light sources and optical waveguides in any way, it being necessary to provide at least two light sources and optical waveguides. Preferably the light sources are actuated in a time sequence with which it is possible to achieve a scanner effect that is directed from the inside of a vehicle toward the outside of a vehicle. In this arrangement, this corresponds to a sequence in which first the light source 12d is activated, then 12c, 12b, and finally 12a.

A light pattern produced in this way is especially uniform and has no unwanted dark areas. The scanning direction of the scanner in FIG. 2 is indicated by an arrow marked with the letter L. In order to meet legal requirements when using the scanner on a vehicle, it can be provided that the scanning direction L of the scanner that is produced by the light system 2 runs from the middle of the vehicle to an outside area of the vehicle, for example from a vehicle's radiator/grill toward its fender. In the embodiment shown, the emission element 10 is made in a single piece and has a continuous light exit surface 25.

The diameter d of the illumination rods (see FIG. 2) is less than the height h of the corresponding step (see FIG. 4), which preferably is at least 1 mm larger than the diameter d. Typical diameters of the optical waveguides 11a through 11d or the illumination rods are between 6 mm and 10 mm. The individual optical waveguides 11a through 11d preferably run essentially parallel to one another, at least in sections, which allows the light sources 12a through 12d associated with the optical waveguides 11a through 11d to be arranged close together and mounted on a common heat sink. This allows more compact construction. The optical waveguides 11a through 11d can have shield elements arranged between them (not shown in the figures), which are opaque, allowing them to prevent unwanted coupling between the optical waveguides 11a through 11d. The light out-coupling sections 14a through 14d of the optical waveguides 11a through 11d are preferably separated from a corresponding light coupling section 18a through 18d of the emission element 10 by a distance s of at least 1 mm. In other words, the optical waveguides 11a through 11d have areas (light out-coupling sections 14a through 14d) from which light is deflected forward into the emission element 10 by deflecting prisms (the irregularities 13). In addition, to conduct the light toward the light out-coupling sections 14a through 14d, the optical waveguides 11a through 11d have areas with preferably smooth cladding, to forward light as free of loss as possible.

FIG. 3 shows a perspective representation of a detail of the light system 2 according to FIG. 2 in which only three optical waveguides 11a through 11c are shown. It shows light entrance surfaces 20a through 20c of the optical waveguides 11a through 11c, into which the light sources 12a through 12c (not shown in FIG. 3) couple light. These light entrance surfaces are only schematically represented and only serve as an example, and naturally can be differently designed, and are adapted to the emission characteristics of the light sources that are used, to ensure efficient use of the emitted luminous flux. The optical waveguides 11a through 11c each have a light out-coupling section 14a through 14c, each containing optical irregularities or irregular elements 13a through 13c in the form of prism-like projections or depressions, for example. The irregularities or irregular elements 13a through 13c (each optical waveguide preferably has at least one light out-coupling section with irregularities) are set up to couple light into corresponding light coupling surfaces 18a through 18c of the emission element 10, the sum of the light coupling surfaces forming a light coupling section 19 of the emission element 10. It is essential for the invention that each optical waveguide have an area for efficient conduction of the light, this area being free of irregularities (e.g., due to a smooth outside contour; as in the case of optical fibers)—corresponding to the "light conducting section" 15. In addition, each optical waveguide has an area for out-coupling light, namely a "light out-coupling section" 14, wherein the light is out-coupled using irregularities, e.g., prism surfaces 13, arranged within the light out-coupling section 14.

The optical waveguide light out-coupling sections 14a, b, c, d are associated with the emission element irradiation areas 18a, b, c, d.

FIG. 4 shows a detailed representation of individual components of the light system 2 according to FIG. 3. In this figure it is possible to see the height h of a step of the emission element 10, this step being formed by the step surface 17b (or 17a). The step surfaces 17a or 17b (and the other step surfaces not shown in FIG. 4) are delimited by corresponding edges 36b, 37a, the edge opposite edge 37a (not visible in FIG. 4), and by the edge 38a or 36c, 37b and 38b, etc. The edges 36b, 39b (and an edge running parallel to the edge 39b, not shown in this figure) and 38b delimit the light coupling surface 18b (this applies analogously for other light coupling surfaces).

FIG. 5 shows another perspective representation of a detail of individual components of the light system 2. In this figure it can be seen that the step surface 17a or the edge 37a is oriented parallel to a vehicle axis, which points in the driving direction when a vehicle is driving straight forward. This makes it possible to keep areas lying between the light out-coupling sections 14a through 14c as small as possible, achieving homogeneous light emission. The light patterns V-A and V-B produced by the emission element 10 or the associated optical waveguides 11a and 11b overlap, so that no dark areas appear between the light patterns V-A and V-B.

FIG. 6 shows, in a detailed representation of FIG. 5, a sample course of a light beam a coupled in through the optical waveguide 11b into the emission element 10 and emitted from it. The light beam a is reflected off an irregularity 13b (for example a prism surface) shown in detail in FIG. 6a to the nearest place in the direction of light propagation (that is, to a first out-coupling irregularity), the light beam a being refracted at the transition from the optical waveguide 11b and into the emission element 10 (and at every following transition between media with different refractive indices). This offsets the light beam a to the side, the offset being dependent on the refractive index of the materials of the optical waveguide and the emission element and the surrounding medium (air), and the magnitude of the distance s. The light beam a is reflected by the position and form of the irregularity 13b1, so that after exiting the optical waveguide 11b it is offset in relation to the vehicle axis, and is oriented parallel to it, so that a depicted area lying in front of the emission element 10, between the out-coupling sections 14a and 14b, is also supplied with light beams, and is illuminated. The reference letter n designates a normal axis to a prism surface of an irregularity.

FIG. 6a shows a simplified representation of the transition of the light beam a from the optical waveguide 11b into the emission element 10; in this representation the refraction of light in the transition between the optical waveguide 11b and the emission element 10 has been disregarded. A lateral displacement $\delta L$ corresponds to the normal distance of the edge 38a or the step surface 17a to a first irregularity 13b1 of the optical waveguide 11b, so that the light beam a exiting from the optical waveguide 11b is directed past the edge 38 and into the border area of the light patterns L-A and L-B.

A recommended minimum value for the lateral displacement $\delta L$ is calculated from the following parameters shown in FIG. 6a:

$\delta L$ . . . Lateral displacement in the (horizontal) normal direction to the vehicle axis $\delta L^*$ . . . Lateral displacement along the optical waveguide h . . . Height of the step d . . . Diameter of the optical waveguide s . . . Width of the air gap between the optical waveguide and the step body $\alpha$ . . . . . . Tilting (for the respective step) of an optical waveguide carrier curve to the vehicle's transverse direction n . . . Refractive index of the materials (n1 for the optical waveguide, n2 for the emission element)

$$\delta L = \delta L1 + \delta L2 = (\delta L1^* + \delta L2^*) \cdot \cos \alpha = \cos \alpha \cdot \{D^* \cdot ([\sin(\alpha-\beta_1)]/[\sin \gamma]) + h \cdot ([\sin \varphi]/[\sin(90°+\beta_2)])\} = \cos \alpha \cdot \{D^* \cdot ([\sin(\alpha-\beta_1)]/[\cos(\beta_1)]) + h \cdot ([\sin(\alpha-\beta_2)]/[\cos(\beta_2)])\}$$

where $\sin \alpha = n_1 \sin \beta_1$ & $\sin \alpha = n_2 \sin \beta_2$ and $D^* = d/\cos \alpha$ for $n1 = n2 = n$ (thus $\beta_1 = \beta_2 = \beta$) the expression for the lateral displacement of the first irregularity 13b1 is simplified $$\delta L = \cos \alpha \cdot ([\sin(\alpha-\beta)]/[\cos(\beta)])\{D^* + h\}$$

From this, a minimum for the lateral displacement $\delta L$ is calculated according to $$\delta L^* = \delta L/(\cos \alpha).$$

All of the mentioned inventive embodiments can be economically and efficiently produced and allow a compact arrangement of the light sources, which can be arranged, for example, on a common heat sink and/or a common circuit board.

In consideration of this teaching, the invention can be modified in any way by the person skilled in the art, and therefore it is not limited to the embodiments shown. It is also possible to take individual aspects of the invention and combine them with one another. What is essential are the ideas on which the invention is based, which the person skilled in the art who knows this description can realize in diverse ways, and nevertheless maintain them as such.

The invention claimed is:

1. A motor vehicle headlight with a light system (2) comprising:
    at least two light sources (12a through 12d);
    at least two optical waveguides (11a through 11d);
    at least one downstream transparent emission element (10); and
    at least one controller (5) for time-offset actuation of the at least two light sources (12a through 12d), each of the at least two light sources (12a through 12d) being set up to couple light into a corresponding one of the at least two optical waveguides (11a through 11d), the at least two optical waveguides (11a through 11d) each having at least one light out-coupling section (14a through 14c) that is set up to couple light into a light coupling section (19) of the at least one downstream transparent emission element (10),
    wherein the light coupling section (19) of the at least one downstream transparent emission element (10) is step-shaped, the at least one downstream transparent emission element (10) being formed as a single piece.

2. The motor vehicle headlight of claim 1, wherein the at least two optical waveguides (11a through 11d) each have two straight sides (11d', 11d''') that are connected together by means of a curved section (11d''), the straight sides (11d', 11d''') including an angle of at least 60°.

3. The motor vehicle headlight of claim 1, wherein the at last two optical waveguides (11a through 11d) are in the form of illumination rods.

4. The motor vehicle headlight of claim 1, wherein the number of the at least two optical waveguides (11a through 11d) exceeds the number of steps of the at least one downstream transparent emission element (10) by one.

5. The motor vehicle headlight of claim 1, wherein the at least two optical waveguides (11a through 11d) comprise at least three optical waveguides (11a through 11d).

6. The motor vehicle headlight of claim 1, wherein the height (h) of every step of the at least one downstream transparent emission element (10) is greater than the diameter (d) of a corresponding optical waveguide (11a through 11d) of the at least two optical waveguide (11a through 11d).

7. The motor vehicle headlight of claim 1, wherein the at least two optical waveguides (11a through 11d) run essentially parallel to one another, at least in sections.

8. The motor vehicle headlight of claim 1, wherein the at least two optical waveguides (11a through 11d) have shield elements arranged between them.

9. The motor vehicle headlight of claim 1, wherein the at least two optical waveguides (11a through 11d) are separated from one another by at least 1 mm.

10. The motor vehicle headlight of claim 1, wherein the light out-coupling section (14a through 14c) of the at least two optical waveguides (11a through 11d) is separated from the light coupling section (19) of the at least one downstream transparent emission element (10) by at least 1 mm.

11. A motor vehicle with a motor vehicle headlight according to claim 1.

12. The motor vehicle headlight of claim 3, wherein the at least one downstream transparent emission element (10) has a continuous light exit surface (25).

* * * * *